United States Patent [19]

Lippl

[11] 4,441,305

[45] Apr. 10, 1984

[54] MULTI-ROW CORN CUTTER FORAGE HARVESTER AND/OR CORN PICKER FORAGE HARVESTER

[75] Inventor: Wilhelm Lippl, Ichenhausen-Oxenbronn, Fed. Rep. of Germany

[73] Assignee: Karl Mengele & Söhne GmbH & Co., Günzburg, Fed. Rep. of Germany

[21] Appl. No.: 413,986

[22] Filed: Sep. 2, 1982

[30] Foreign Application Priority Data

Sep. 18, 1981 [DE] Fed. Rep. of Germany ....... 3137115

[51] Int. Cl.³ .................. A01D 73/00; A01D 69/00
[52] U.S. Cl. .................................. 56/15.6; 56/228
[58] Field of Search ................. 56/15.5, 15.6, 228

[56] References Cited

U.S. PATENT DOCUMENTS 3,110,146 11/1963 Lotshaw ............................. 56/228
3,599,411 8/1971 Scarnato et al. .................... 56/228
3,751,891 8/1973 Molzahn et al. .................... 56/228
4,212,147 7/1980 Werner ............................... 56/228
4,359,854 11/1982 Witzel ................................ 56/228

FOREIGN PATENT DOCUMENTS 2116583 10/1972 Fed. Rep. of Germany ....... 56/15.6
2735598 2/1979 Fed. Rep. of Germany ....... 56/15.6
7814602 5/1979 Fed. Rep. of Germany ....... 56/15.6

Primary Examiner—Paul J. Hirsch
Attorney, Agent, or Firm—Toren, McGeady and Stanger

[57] ABSTRACT

A multi row corn cutter harvester is disclosed having two positions of operation when connected to a three point towing bracket of a tractor. The harvester may be connected either alongside the tractor in an operating mode or behind the tractor in a second operating mode. A system of drive including relative locations of input and output shafts and connections is disclosed.

3 Claims, 2 Drawing Figures

MULTI-ROW CORN CUTTER FORAGE HARVESTER AND/OR CORN PICKER FORAGE HARVESTER

The invention relates to a multi-row corn cutter forage harvester and/or corn picker forage harvester, particularly a forage harvester of disk wheel construction, with a side-mounted device consisting essentially of a tranverse crossbar, connected to the three-point towing bracket of a tractor, or a mounted frame which is provided with a lockable swivel hinge for bringing the forage harvester into an operating position to the side of the tractor and to a transporting position behind the tractor, wherein the transverse crossbar contains or carries an angular gear opposite the power take-off shaft of the tractor, and with a drive shaft connection on the machine side.

Due to the side-mounted device of the forage harvester, the towing jaw of the tractor remains free for towing a wagon which contains the harvested material, so that the towing arrangement is short and is thus easy to maneuver during the work.

In a known, side-mounted corn forage harvester of this type—compare the brochure No. 038 211 III-s by Poettinger in Grieskirchen, Austria—a mounted trestle is provided which is connected by means of a swivel hinge to a transverse crossbar of the forage harvester, having a supporting wheel on the other side. The forage harvester can be swivelled by 90° from the side-mounted position into a longitudinal transporting position behind the tractor by releasing a locking device. This results in a long towing arrangement which is difficult to drive on the road.

A disadvantage of the side-mounted arrangement arises when the forage harvester first begins to cut the corn cultivation surface, because the tractor wheels in general have to pass over several rows of plants and the layer of corn, even if it is suitable to be picked up, can be harvested only with great losses and with special equipment.

Corn cutter forage harvesters and/or corn picker forage harvesters in the rear-mounted modification have thus already been arranged on the three-point hydraulic system of tractors which can be driven in both directions by means of double linkages and equipped with actuation and control means.

However, the disadvantage in this case is that the harvested material has to be conveyed from the forage harvester over the tractor to the collecting trailer, towed at the front towing jaw of the tractor, which may result in losses of harvested product, depending on the state of the harvested material and the associated conveying width of the forage harvester, as well as losses due to wind scattering.

In addition, the special equipment required for operating the tractor in both driving directions is very expensive.

The object of the invention consists in creating a side-mounted device for corn cutter forage harvesters and/or corn picker forage harvesters of the type described in the beginning in which the forage harvester can be operated in a simple manner in both the side-mounted modification and the rear-mounted modification, without a long conversion time, by means of a side-mounted device which always ensures a short towing distance and which also provides a shorter towing distance when moving on the road.

The object of the invention is achieved if one member of the swivel bearing is located on the end of the machine side of the transverse crossbar and the other member is located on the frame and that above and below the swivel hinge at the forage harvester or its frame a stationary gearing is installed in such a way that its shafts lie approximately transversely to the driving plane in both approximately 180° swivel positions of the forage harvester, and that a drive part of the stationary gearing from a spur wheel reduction gearing is provided with always one propeller shaft connection at the two sides of the stationary gearing housing which are parallel to the driving plane and approximately equally far removed from the center of rotation of the swivel hinge and arranged alternately in the swivel positions to be opposite the drive shaft connection of the angular gearing on the machine side, wherein the spur wheel reduction gearing is constructed as a reversing gear which drives the propeller shaft connections in each swivel position in the same direction of rotation.

In order to convert the forage harvester for operation into both swivel positions, one only needs to remove the drive shaft on the machine side between the angular gear and one of the propeller shaft connections of the stationary gearing and to release the locking device.

In the rear-mounted modification, a lane can be cleared in the corn cultivation area so that, after the forage harvester has been converted to the side-mounted modification, it no longer has to drive over any harvested material.

The invention is elucidated and described with the aid of an exemplified embodiment. In the drawing.

Figure 1:
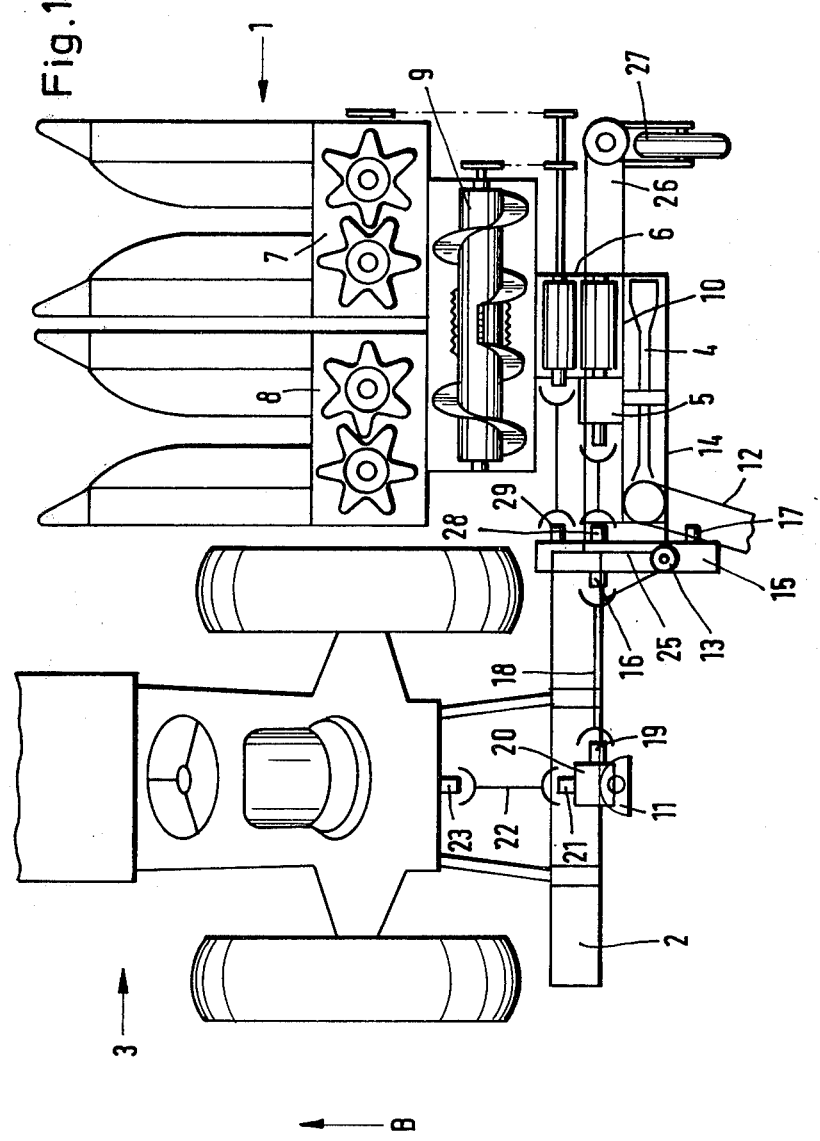
FIG. 1 shows a corn cutter forage harvester according to the invention in the operating position alongside the tractor.

In the drawing, a double-row corn cutter forage harvester is identified with 1 and a tractor connected therewith by means of a transverse crossbar 2 is identified with 3. The forage harvester 1 is preferably a disk wheel forage harvester with a cutter wheel 4 which is driven by means of an angular gear 5. Take-in elements 6 convey the corn plants, cut off and taken up by the two corn teeth 7 and 8, to the not shown counter cutter in the mouthpiece 10 of the cutter wheel housing. The transport vehicle which is not shown and which receives the harvested material can be coupled directly to the towing jaw 11 at the transverse crossbar 2 in the side-mounted modification (FIG. 1) which results in a short, easily maneuverable towing arrangement. However, in the rear-mounted modification according to FIG. 2, the transport vehicle is coupled during harvesting in direction of the arrow B at the towing jaw which is provided at the front of the tractor and is not shown, and during movement on the road in direction of the arrow A it is coupled to a towing device of the forage harvester.

In a side-mounted modification as well as in the rear-mounted modification, the operation of the corn cutter forage harvester is essentially made possible by means of a swivel hinge 13 and a stationary gearing 15 which is rigidly connected with a structural trestle 14 of the forage harvester. The stationary gear 15 is provided at always one side of its housing with always one propeller shaft connection 16 and 17, each arranged offset and approximately equally far from the swivel hinge 13. The not shown spur wheels of the propeller shaft connections mesh with a spur wheel which reverses the direction of rotation. The stationary gearing includes spur wheel reduction gearing to which a variable speed gear is connected.

In the swivel position according to FIG. 1, the propeller shaft connection 16 is connected by means of a drive shaft 18 with the machine side drive shaft connection 19 of an angular gear 20 which is arranged below the transverse crossbar 2, the angular gear in turn is connected with its drive shaft connection 21 and a power take-off shaft 22 with the tractor power take-off shaft 23.

Figure 2:
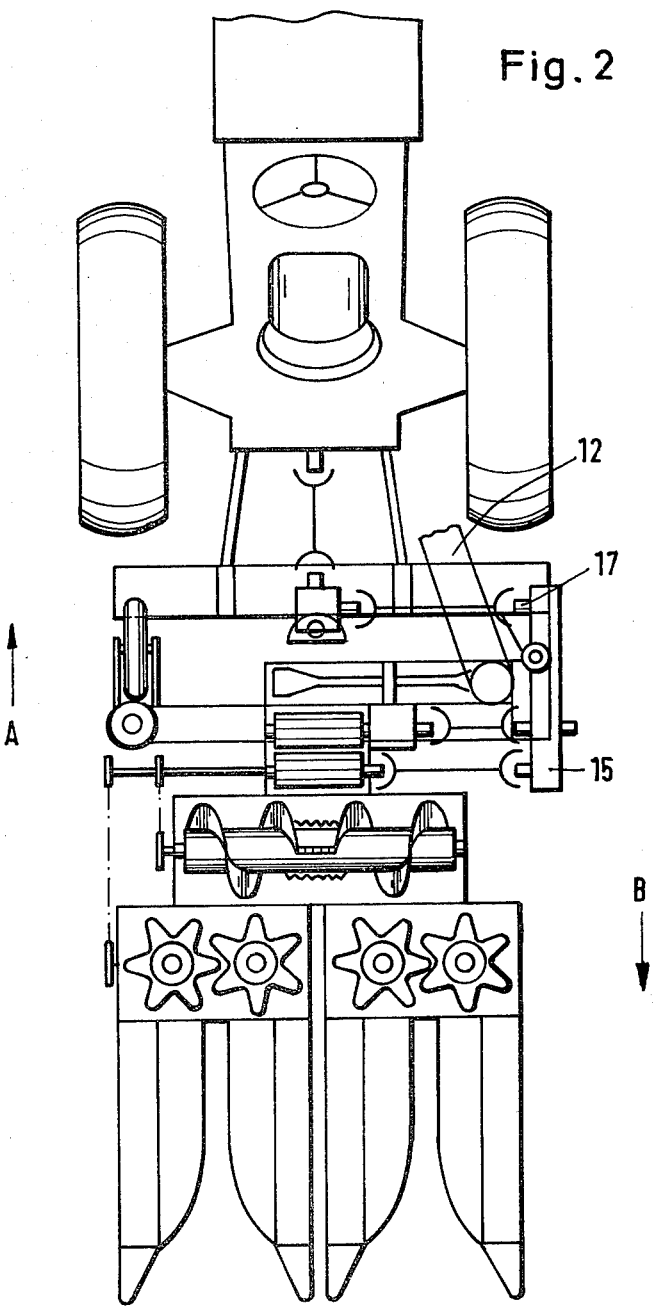
FIG. 2 shows the corn cutter forage harvester according to FIG. 1 in the rear-mounted modification according to the invention.

As can be seen in FIG. 2, after removal of the drive shaft 18 during swivelling of the forage harvester 1 to the rear-mounted position, the propeller shaft connection 17 of the stationary gear 15 which is also swivelled with the forage harvester by 180° now reaches the position previously occupied by the propeller shaft connection 16.

Surprisingly, all that is required to convert the forage harvester 1 to the two operating positions is simply to actuate a locking device, indicated at 25, and removal or insertion of the drive shaft 18.

The support wheel which is attached at a crossbar 26 effects with the swivel hinge 13, located on the other side, a stable support of the forage harvester in the operating position and during transport on the road.

As can also be seen in the drawing, a machine-side drive shaft connection 28 is associated with the same spur wheel as the propeller shaft connection 16, while the driving shaft connection 29 on the machine side has a different rotational speed.

I claim:

1. A multi-row corn cutter forage harvester and/or corn picker forage harvester, such as a disk wheel forage harvester, comprising a first crossbar arranged to be connected to the three-point towing bracket of a tractor, a side-mountable device comprising a frame, a harvester device mounted on said frame, said frame including a lockable swivel hinge for pivotally moving the frame and harvester device into a first operating position located along one side of the tractor and a second operating-transporting position located behind the tractor, and means for driving said harvester device in the first and second operating positions, wherein the improvement comprises an angular gear (20) located on said first crossbar (2) and arranged to be positioned opposite the power take-off shaft of the tractor, said driving means including a stationary gearing (15) mounted on said frame (14) adjacent said swivel hinge (13), said frame is pivotally displaceable by said swivel hinge through 180° between the first operating position and the second operating position, said driving means includes a first shaft connection (16) for said stationary gearing, a second shaft connection (28), and a third shaft connection (29) each of said first, second and third shaft connections extend parallel to said first crossbar in the first and second operating positions, said frame includes a second crossbar (26) disposed in parallel relation with said first crossbar in the first and second operating positions, said angular gear (20) including a drive shaft connection (19), a drive shaft (18) extending between said drive shaft connection and said first shaft connection, said second shaft connection located aligned with said first shaft connection and said third shaft connection spaced laterally from said second shaft connection, said harvester device including take-in elements (6) and a cutter wheel (4), means connecting said second shaft connection to said cutter wheel, means connecting said third shaft connection to said take-in elements, said stationary gearing including a fourth shaft connection (17), said first and fourth shaft connections spaced apart in the direction extending transversely of said first crossbar and disposed in parallel relation, said first shaft connection (16) and said second shaft connection (17) connected to said stationary gearing, and in said second operating position said fourth shaft connection (17) is connected to said drive shaft connection (19) via said drive shaft (18), wherein in the displacement of said frame and harvester device from the first operating position to the second operating position only said drive shaft (18) is changed from its connection to said first shaft connection (16) to said fourth shaft connection (17).

2. A multi-row corn cutter forage harvester and/or corn picker forage harvester according to claim 1, characterized in that a variable speed gear is connected to spur wheel reduction gearing of said stationary gearing (15), and that said second drive shaft connection (28) which also forms a continuation of its spur wheel shaft is associated with said first shaft connection (16) on the other side of said stationary gearing (15).

3. A multi-row corn cutter forage harvester and/or corn picker forage harvester according to claim 1, characterized in that a member of said swivel hinge (13) is arranged at a bracket which extends rearwardly at the machine-side end of said transverse crossbar (2).

* * * * *